Oct. 12, 1965  J. B. WAGNER  3,211,476
COUPLING FOR A FLUID CONDUIT
Filed Nov. 19, 1962
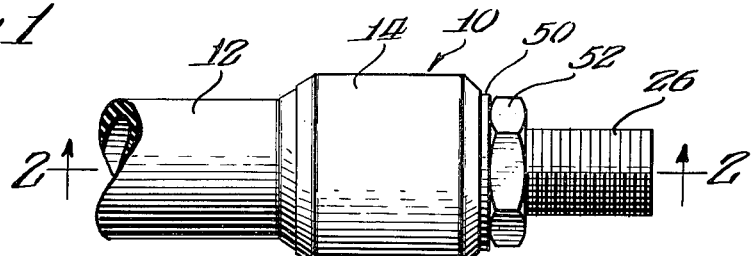
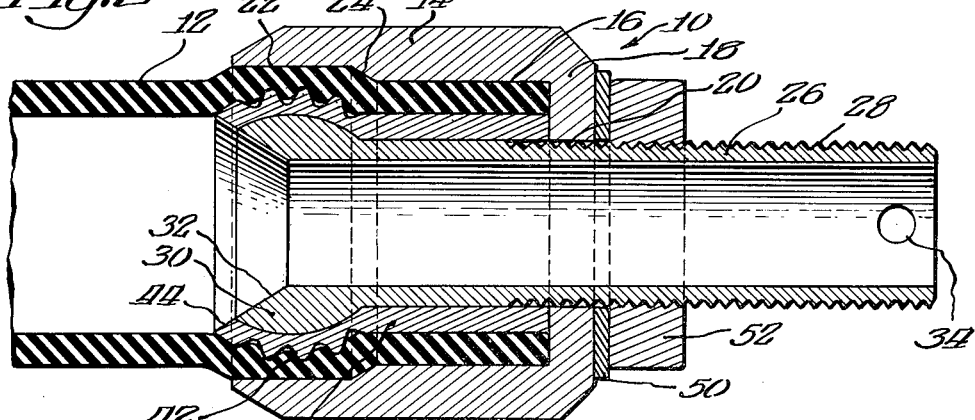
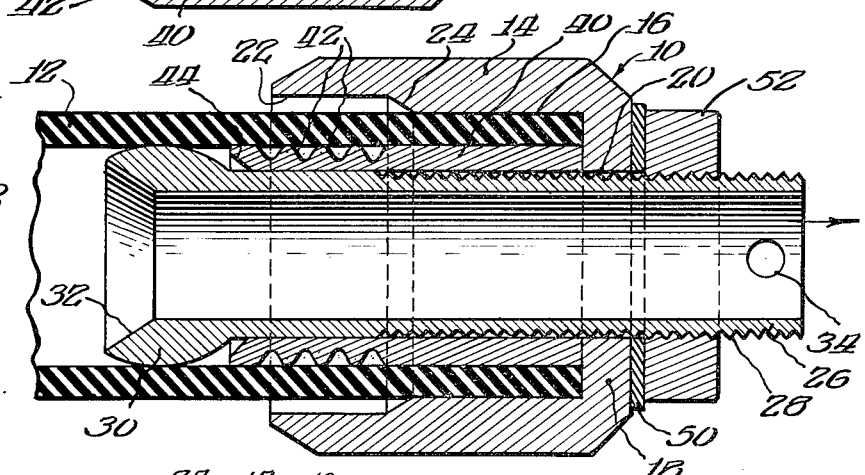
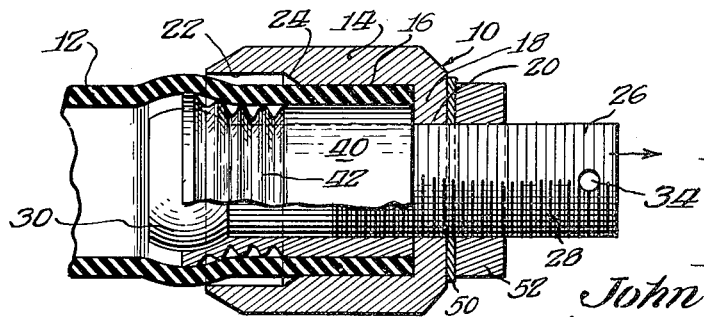
Inventor:
John B. Wagner
By Bair, Freeman & Molinare
Attys.

United States Patent Office 3,211,476
Patented Oct. 12, 1965

3,211,476
COUPLING FOR A FLUID CONDUIT
John B. Wagner, 415 S. Taylor, Oak Park, Ill.
Filed Nov. 19, 1962, Ser. No. 238,495
6 Claims. (Cl. 285—258)

The present application is a continuation-in-part of my copending application, Serial No. 119,865, filed June 27, 1961, now abandoned.

This invention relates to couplings for use in connection with fluid conduits, such as a flexible hose, tubing or pipe for handling of liquids or gases under pressure or vacuum. Such couplings are extensively used for connecting fluid conduits to hydraulic cylinders, loading hoses, pumps, tanks, hoppers, pipe lines, and numerous other industrial uses, as well as for military and space purposes.

In recent years, scientific development of fluid handling and fluid operated systems and apparatus has been directed toward the use of relatively high fluid pressures. While hoses, tubing and piping are now available for such high pressure uses, the couplings that are now and which have heretofore been available are incapable of satisfactory use in connection with such high fluid pressure systems and apparatus.

One of the objects of this invention is to provide a novel coupling for use with hoses, tubing or pipes which is capable of satisfactory use for handling high fluid pressures, as well as being capable of withstanding great hydraulic shock loads.

Another object is to provide a novel coupling of the character indicated which is capable of being quickly and easily applied to a hose, tubing or pipe without requiring the use of special tools or apparatus.

A further object is to provide a novel coupling construction of the character indicated which provides greatly increased gripping efficiency in its attachment to a hose, tubing or pipe.

A still further object is to provide a novel coupling construction of the character indicated which is capable of being quickly and easily installed in the field, and which is especially suitable for re-use so as to effect substantial savings in time, labor and material.

Still another object is to provide a novel coupling of the character indicated which is of simple construction, capable of being economically manufactured and installed without requiring special or complicated machinery or tools.

Other objects and advantages of this invention will be apparent from the following description, taken in connection with the accompanying drawing, in which:

FIGURE 1 is an elevational view of the coupling involving the present invention shown attached to a hose.

FIGURE 2 is an enlarged, axial sectional view through the coupling and hose in assembled relation, taken as indicated at line 2—2 on FIGURE 1.

FIGURE 3 is an axial sectional view showing the relation of the various components of the coupling when initially placed over the end of the hose preparatory to attachment thereto.

FIGURE 4 is an axial sectional view, on reduced scale, through the coupling and hose showing an intermediate stage and position of the components in process of securing the coupling in place on the end of the hose.

Referring now to the drawing, the total coupling assembly is indicated generally by the reference numeral 10 and, as shown in FIGURES 1 and 2, is fixedly attached to a hose 12. As shown in the drawing, the hose 12 may be understood to be of suitable flexible material, such as rubber or synthetic rubber and may, when conditions of use necessitate, be of reinforced type, such as having wire strands or a wire mesh embedded therein. It is also to be understood that the coupling may be satisfactorily employed in connection with tubing or pipe formed of metal or synthetic plastic materials.

The coupling includes a cup-shaped body 14, which may be formed as a casting or forging, or may be machined from bar or rod stock. The body includes a cylindrical bore 16, of a diameter approximately equal to the outer diameter of the hose 12, and the body includes an end wall 18 having a central opening 20. The forward portion of the body is counter-bored, as indicated at 22, and the counter-bore portion 22 and the bore portion 16 are joined by an inclined annular fillet 24, which bores and fillet portion define an open ended chamber of cylindrical cross-section. The fillet 24 is formed with rounded contours where it merges into the walls of the bores 16 and 22 so as to insure against injury or damage to the hose or conduit to which the coupling is attached.

Mounted within the body 14 is a tubular coupling member 26, including a main shank portion which extends through the opening 20 in the end walls of the coupling body, and the exterior surface of the shank portion of the tubular member, throughout a major portion of its length, extending to its outer free end, is threaded, as indicated at 28. The opposite or inner end of the tubular member is formed with an enlarged portion 30 which constitutes an expansion head. The expansion head has an outer, inclined, wedging surface and, as shown, the head is in the form of a segment of a sphere. The forward end of the expansion head portion of the tubular member is counter-bored to provide an inclined, frusto conical surface 32. Preferably, the tubular member 26 is formed of metal, and the expansion head 30 is heat treated for hardness, and the diameter of the head is substantially equal to the inner diameter or bore of the hose 12 so that it may be easily telescoped into the hose. The outer free end of the shank portion of the tubular member 26 is provided with an opening 34, the purpose of which will be hereinafter described.

Telescoped over and snugly fitting over the shank portion of the tubular member 26 is a tubular pressure element 40, the outer diameter of which initially is substantially equal to the inner diameter of the bore of the hose 12, so that said element, when mounted upon the tubular member 26, may be conveniently telescoped into the bore of the hose preparatory to attachment of the coupling to the end of the hose. The outer surface of the forward portion of the pressure element 40 is provided with a plurality of axially spaced, circumferential grooves 42, in order to reduce the cross-section of material of said pressure element at the forward end thereof. The grooves formed in the pressure element desirably are so formed as to provide rounded contours to insure against cutting or scaring of the inner wall of the hose. The forward or inner end of the pressure element is counter-bored to provide an inclined frusto conical surface 44.

The forward portion of the pressure element 40, that is provided with the grooves 42, is a trans-axially deformable portion, and is rendered more readily deformable by the reduction in the cross-sectional mass by the provision of the circumferential grooves. This element may be formed of metal or suitable plastic material. When it is formed of metal it is preferable that the metal be somewhat ductile in nature, such as annealed tubing for high pressure uses. Copper, bronze, brass or synthetic plastic tubular material may be employed for medium or low pressure uses. As may be seen in FIGURE 3, the axial length of the deformable portion is approximately the same length as the unthreaded portion of the shank of the tubular member 26, and this same length of the deformable portion is desirably such that when it has been deformed, as hereinafter described, it is substantially equal to the axial length of the expansion head 30 and is approximately the same as the axial length of the counter-bore portion 22 of the body 14.

In applying the coupling to a hose, tubing or pipe, the deformable pressure element 40 is first telescoped over the shank portion of the tubular member 26, and a washer 50 is then placed over the shank portion of said member 26, and a nut 52 is then threaded onto the shank portion so as to crowd the deformable element forwardly on the shank portion of the tubular member until the forward end is adjacent the expansion head 30. The assembly is then telescoped into the bore of the hose 12, until the outer end of the pressure element is flush with the end of the hose. The nut 52 and washer 50 are then removed, and the cup-shaped body 14 is then placed over the end of the tubular member 26 and telescoped over the free end of the hose 12 until the outer free end of the hose abuts against the end wall 18 of the body, as seen in FIGURE 3 of the drawing. The washer 50 is then placed in position against the outer surface of the end wall of the body, and the nut 52 threaded onto the tubular element. By rotating the nut 52, the tubular member 26 is moved axially outwardly of the body 14, by the thrust transmitted from the nut through the washer 50 to the end wall of the body 14. Because the outer end of the pressure element 40 abuts against the inner surface of the end wall 18 of the body, such outward axial movement of the coupling member 26, causes the expansion head 30 to engage the counter-bore wall 44 of the inner end of said deformable element 40, and causes radial enlargement and expansion of the inner end of said element 40. As the nut 52 is further rotated, the expansion head of the tubular member is drawn interiorly of the deformable end portion of the pressure element, causing radial expansion of a correspondingly aligned portion of the hose 12, as seen in FIGURE 4 of the drawing. It is to be noted that the counter-bore 44 at the inner end of the deformable portion of element 40, is so related to the contour of the expansion head as to facilitate the movement of the expansion head into the deformable element. By virtue of continued relative rotational movement of the nut 52 and member 26, the expansion head causes the deformable portion at the inner end of the pressure element 40 to be further expanded, and likewise causes further radial expansion of a correspondingly aligned portion of the wall of the hose 12, until said portion of the hose comes in contact with the inner wall of the counter-bore portion 22 of the body. When the nut 52 and the tubular member 26 have been relatively rotated an adequate amount for positioning the tubular member 26 in proper operative relation, at that time the expansion head 30 is so positioned as to exert its maximum compressive force against the deformable portion at the inner end of the pressure element 40, and the corresponding aligned portion of the wall of the hose 12, in firm pressure engagement with the inner wall of the counter-bore of the body. The provision of grooves in the deformable portion creates a locking effect with the hose and aids in squeezing and gripping of the hose to firmly and sealingly lock the hose to the coupling assembly.

To facilitate relative rotation of the nut and member 26, and apply adequate torque from the nut against the body 14 for causing outward axial movement of the tubular member, the nut or the tubular member desirably should be held against rotation. For this purpose the aperture 34 at the outer end of said member serves to accommodate a pin adapted to be extended through correspondingly aligned openings in an auxiliary nut, or other element (not shown) mounted on the outer end of said tubular member, and which, in turn, may be held by a suitable tool, or in a vise, while nut 52 is rotated, or vice versa.

Where the hose employed includes metallic reinforcements, such as wire or braid, or is of relatively heavy duty construction, or is of a relatively large diameter, the matter of applying the coupling to the hose may be facilitated by substitution of a ball race between the nut 52 and the end wall of the body 14.

When the coupling is properly and fixedly secured to the end of a hose, as may be seen in FIGURE 2 of the drawings, the frusto conical counter-bores 32 and 44 at the inner ends of the tubular member and pressure element, respectively, are disposed substantially in alignment with each other, as seen in FIGURE 2. By virtue of this arrangement pocketing of fluid is eliminated and thus insures uniform flow from the hose through the interior of the tubular coupling member 26. Also, the pressure of the fluid through the coupling tends to urge the expansion head radially outwardly, to aid in maintaining firm gripping and squeezing of the wall in the coupling assembly.

The coupling of the present invention provides a positive, firm and fixed connection to the end portion of a hose, tube or pipe and substantially eliminates the possibility of fluid leaks at the coupling connection. The coupling is so designed as to permit its proper use in handling relatively high fluid pressures, and is capable of handling pressures substantially in the maximum range for which the respective hoses, tubing or pipes are designed for accommodating. The wall thickness of the body of the coupling will be varied as required to insure providing adequate strength for handling the maximum pressure to be accommodated by the hose, tubing or pipe to which the coupling is to be connected.

Due to the design and construction of my novel coupling, it will be apparent that when it is installed, the maximum gripping and squeezing pressure on the hose remains constant because of the expansion head remaining in its final adjusted position. The reactive forces created in the hose, especially when the hose is of the reinforced type, incident to expansion tends to force the deformable end portion of the member 40 to follow the contour of the expansion head 40, as seen in FIGURE 2.

Couplings embodying the present invention are of such nature that they may be quickly applied in the field by the use of a relatively simple tool in the nature of a wrench. The coupling also is of such construction that it is capable of re-use, and it may be stripped from the end of a hose and re-applied to another or new section of hose, and merely requires the use of a new pressure element.

In replacing a damaged or defective hose, the coupling is removed by first backing the nut 52 away from the end of the body, stripping of the hose as far as practical from the coupling, and then by applying inward axial pressure to the tubular member 26, the expansion head is driven inwardly and clear of the deformable section of the pressure element. When this occurs, outward radial pressure on the deformable section of the pressure element and the wall of the hose is greatly reduced, and it will then be possible to remove the body 14 and complete the stripping of the end portion of the hose so that the pressure element may be removed from the tubular member and a new one applied thereto for making up a new set of components for the coupling to be applied to another hose.

Wherever in the specification and/or claims the term "hose" is referred to, it is intended that such term shall be accorded a meaning to include various types of flexible hoses now available, including hoses of the reinforced type, as well as tubing and pipe.

Although I have herein shown and described a certain preferred embodiment of my invention, manifestly it is capable of modification and rearrangement without departing from the spirit and scope thereof. I do not, therefore, wish to be understood as limiting this invention to the precise embodiment herein disclosed, except as I may be so limited by the appended claims.

I claim:
1. A hose coupling comprising a body having a cylindrical chamber and a radially, inwardly-extending end wall, a substantially axially-aligned aperture in the end wall, a tubular coupling member formed of metal and telescopically disposed through said aperture for unrestrained axial movement therein, the inner end of said member having an enlargement formed by an enlarged wall thickness throughout its entire periphery, the outer periphery of said enlargement tapering toward the outer end of said member from substantially a maximum diameter thereof to a minimum diameter at the outer periphery of the wall of said member, the inner terminal end of said enlarged wall portion of said member being inwardly tapered to a point substantially in radial alignment to said maximum diameter, the outer end portion of said member being threaded, a tubular pressure element formed of metal and mounted on said coupling member with a close sliding fit and constructed and arranged to telescope into the bore of the hose, said element having at least its inner end portion deformable, said inner end portion being initially positioned adjacent said outer minimum diameter of said taper on said enlargement and the other end abutting the inner surface of the end wall of the body, and means coacting with said threaded portion of the coupling member and the outer surface of said end wall and providing a reaction force against the end wall of the body to move said coupling member axially outward with respect to said body to cause said enlargement to move into said deformable inner end portion of the pressure element and thereby radially expanding said deformable end portion and a correspondingly aligned portion of the hose to cause the aligned portion of the hose to be firmly squeezed and pressed against the cylindrical wall of the chamber of said body, and said member being retained in said pressure element by the deformed portion thereof, forming by said deformation a metal-to-metal seal between the member and pressure element, and said means serving to firmly secure said coupling in fixed, sealed relation to the end portion of the hose with the body, coupling member and pressure element in fixed relation to each other.

2. A coupling as set forth in claim 1, wherein the inner wall of the chamber of the body being formed with an enlarged cylindrical wall portion located for registration with and engagement by the outer surface of the radially expanded portion of the hose, and in trans-axial alignment with the deformable inner end portion of said pressure element.

3. A coupling as set forth in claim 2 wherein the two cylindrical wall portions of the chamber of the body being joined by a fillet adapted to be trans-axially aligned with a portion of the enlargement of the coupling member when the coupling is fixedly attached to a hose.

4. A coupling as set forth in claim 1 wherein the outer surface of the deformable inner end portion of the pressure element is formed with a plurality of grooves to facilitate deformation of said portion by movement of the enlargement of the coupling member therein.

5. A coupling as set forth in claim 1 wherein the maximum diameters of the enlargement on the coupling member and the pressure element are initially substantially the same as the diameter of the bore of the hose.

6. A hose coupling comprising a body having a cylindrical chamber and an end wall for telescoping over an end of a hose, a tubular coupling member extending through the end wall of the body, the inner end of said member being formed with an enlarged expansion head adapted initially to be telescoped into the bore of the hose, a portion of said member, opposite said head, being threaded, the free end of said expansion head of the coupling member being formed with a tapered counter-bore to facilitate fluid flow from the hose into and through said coupling member, a tubular pressure element mounted on said coupling member and telescoped into the bore of the hose and having an inner end portion of deformable material, said inner end portion being initially positioned adjacent said head and the other end abutting the end wall of the body, and means coacting with said threaded portion of the coupling member, externally of the body, for moving said coupling member axially outward with respect to said body, causing said head to move into said deformable end portion of the pressure element and thereby radially expanding said deformable portion and a correspondingly aligned portion of the hose, causing the aligned portion of the hose to be firmly squeezed and pressed against the cylindrical wall of the chamber of said body and said means serving to firmly secure said coupling in fixed, sealed relation to the end portion of the hose with the body, coupling member and pressure element in fixed relation to each other, the free end of said deformable end portion of the pressure element being formed with a tapered counter-bore to facilitate coacting engagement with said expansion head when the coupling member is moved axially by said means, the surfaces of said tapered counter-bores of said head and pressure element being disposed in substantial alignment when the coupling is fixedly attached to the hose.

References Cited by the Examiner

UNITED STATES PATENTS

| 686,061 | 11/01 | Hart | 285—174 |
|---|---|---|---|
| 1,726,238 | 8/29 | Pipher | 285—174 |
| 2,071,478 | 2/37 | Wick | 285—258 |
| 2,146,756 | 2/39 | Miller | 285—258 |
| 2,150,361 | 3/39 | Chobert | 29—523 X |
| 2,228,018 | 1/41 | Scholtes | 285—258 |
| 2,479,702 | 8/49 | Rood | 285—258 |

FOREIGN PATENTS

| 147,218 | 7/52 | Australia. |
|---|---|---|
| 589,587 | 6/47 | Great Britain. |

CARL W. TOMLIN, *Primary Examiner.*